(12) United States Patent
Wu

(10) Patent No.: US 9,127,798 B2
(45) Date of Patent: Sep. 8, 2015

(54) QUICK CONNECTOR HAVING ANTI-DISENGAGEMENT STRUCTURE

(71) Applicant: Shang-Neng Wu, Pingzhen (TW)

(72) Inventor: Shang-Neng Wu, Pingzhen (TW)

(73) Assignee: AIR KINETIC TECHNOLOGIES CORP., Taoyuan County (TW)

( * ) Notice: Subject to any disclaimer, the term of this patent is extended or adjusted under 35 U.S.C. 154(b) by 267 days.

(21) Appl. No.: 13/622,148

(22) Filed: Sep. 18, 2012

(65) Prior Publication Data

US 2013/0076031 A1 Mar. 28, 2013

(30) Foreign Application Priority Data

Sep. 23, 2011 (TW) .............................. 100134249 A

(51) Int. Cl.
*F16L 37/107* (2006.01)
*F16L 37/10* (2006.01)
*A47C 27/08* (2006.01)

(52) U.S. Cl.
CPC ............. *F16L 37/105* (2013.01); *A47C 27/081* (2013.01)

(58) Field of Classification Search
CPC ....... F16L 37/107; F16L 37/24; F16L 37/244; F16L 37/248; F16L 37/105; A47C 27/081

USPC ................................... 285/361, 376, 396, 402
See application file for complete search history.

(56) References Cited

U.S. PATENT DOCUMENTS

| | | | | | |
|---|---|---|---|---|---|
| 1,851,992 | A | * | 4/1932 | Smith | 285/86 |
| 4,280,723 | A | * | 7/1981 | Moldestad | 285/376 |
| 4,632,433 | A | * | 12/1986 | Kimura | 285/38 |
| 5,727,739 | A | * | 3/1998 | Hamilton | 239/600 |
| 6,206,433 | B1 | * | 3/2001 | Bloomer | 285/88 |
| 2008/0185842 | A1 | * | 8/2008 | Blackman et al. | 285/376 |
| 2008/0200900 | A1 | * | 8/2008 | Aeschlimann et al. | 604/523 |

* cited by examiner

*Primary Examiner* — James Hewitt
(74) *Attorney, Agent, or Firm* — Chun-Ming Shih

(57) ABSTRACT

A quick connector having an anti-disengagement structure includes a first body, a second body and a locking member. The locking member is connected to one end of the first body and stopped by an oil seal. The second body is connected to the first body and the locking member is fitted on the second body. A locking block of the locking member is engaged in a locking recess of the second body to complete the assembly of the first body, the second body and the locking member. Particularly, the locking recess has an anti-disengagement design to prevent any unexpected disengagement and to ensure the connection of the connector.

4 Claims, 7 Drawing Sheets

QUICK CONNECTOR HAVING ANTI-DISENGAGEMENT STRUCTURE

BACKGROUND OF THE INVENTION

1. Field of the Invention

The present invention relates to a quick connector, and more particularly, to a quick connector having an anti-disengagement structure.

2. Description of the Prior Art

A conventional air cushion bed comprises air valves to connect with a plurality of air pipes for air bags, so that the air cushion bed is able to exhaust air and to exchange fresh air. In the past, a fastening belt is used to connect the air pipe and air bag. This fastening belt consumes much time and doesn't have aesthetic. After a period of time, the fastening belt may break to cause the malfunction of the product to influence the goodwill of the manufacturer. Accordingly, the inventor of the present invention has devoted himself based on his many years of practical experiences to solve these problems.

SUMMARY OF THE INVENTION

The primary object of the present invention is to provide a quick connector having an anti-disengagement structure which can be assembled quickly.

Another object of the present invention is to provide a quick connector having an anti-disengagement structure which has aesthetics.

A further object of the present invention is to provide a quick connector having an anti-disengagement structure which is durable and has a lower failure rate.

A further object of the present invention is to provide a quick connector having an anti-disengagement structure which can prevent any unexpected disengagement.

In order to achieve the aforesaid objects, the present invention comprises a first body, a second body and a locking member.

The first body has a press portion at a bottom thereof. The first body has a passage therein. The first body has a first connection opening and an annular groove close to an outer edge of the first connection opening. The annular groove is adapted to receive an oil seal. The locking member has a space therein and a locking block in the space. Preferably, the locking member has two locking blocks. The locking member further has a stop ring at the bottom edge of the space. The second body has a reduced portion at one end thereof. The reduced portion has a groove thereon to receive an oil seal. The second body has a locking recess close to the reduced portion. Preferably, the second body has two locking recesses. The locking recess has a channel. The channel has an L-like shape. The channel is provided with two stoppers protruding from two inner sides of the channel. Each stopper has a chamfer at an outer end thereof and a right-angled inner end. An accommodation room is formed between the two stoppers in the channel. The first body, the second body and the locking member are assembled quickly and won't disengage from each other.

Preferably, when the first body, the second body and the locking member are assembled, the reduced portion of the second body is further connected with an inner sleeve. The inner sleeve has a space therein and a stop ring. The inner sleeve cooperates with the first body to provide a clip and inner support function to the second body.

Preferably, the first body has a second connection opening at another end thereof opposite to the first connection opening. The passage of the first body has a T shape. The first body has a second locking recess close to the second connection opening for connection of a second locking member. The second locking member is to close the second connecting opening. The second locking member has a closed surface. The closed surface may have a through hole. The through hole can be provided as desired. The through hole is adapted to provide a certain air to the air cushion bed for ventilation.

Preferably, the second body is a T-shaped body.

DETAILED DESCRIPTION OF THE PREFERRED EMBODIMENTS

Embodiments of the present invention will now be described, by way of example only, with reference to the accompanying drawings.

Figure 1:
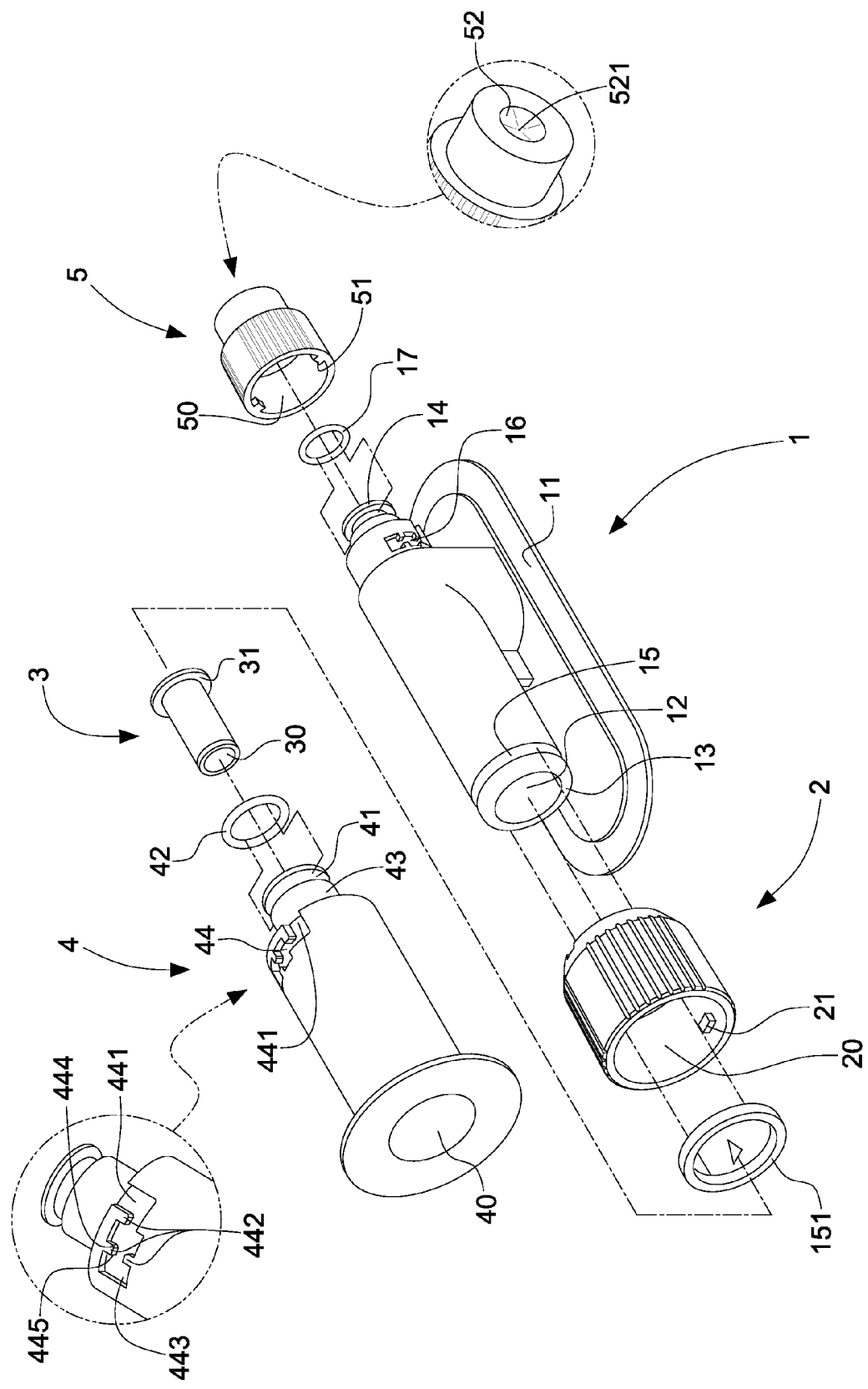
FIG. 1 is an exploded view according to a preferred embodiment of the present invention.
Figure 2:
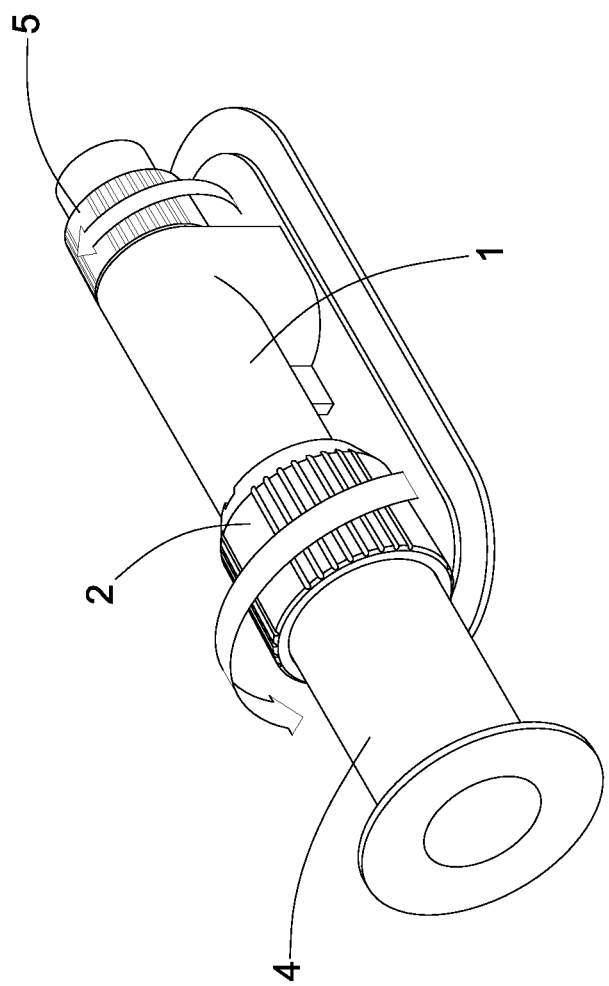
FIG. 2 is a perspective view according to the preferred embodiment of the present invention.
Figure 3:
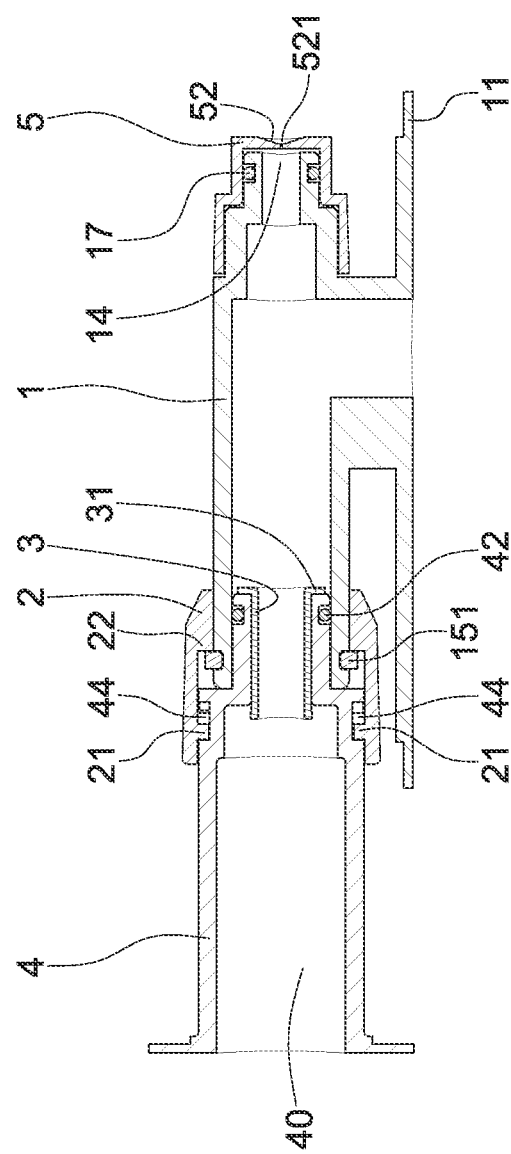
FIG. 3 is a sectional view according to the preferred embodiment of the present invention.

As shown in FIG. 1 to FIG. 3, the quick connector of the present invention comprises a first body 1, a locking member 2 and a second body 4.

The first body 1 has a press portion 11 at a bottom thereof. The first body 1 has a passage 12 therein. The first body 1 has a first connection opening 13 and an annular groove 15 close to an outer edge of the first connection opening 13. The annular groove 15 is adapted to receive an oil seal 151.

The locking member 2 has a space 20 therein and a locking block 21 in the space 20. Preferably, the locking member 2 has two locking blocks 21. The locking member 2 further has a stop ring 22 at the bottom edge of the space 20.

The second body 4 has a reduced portion 43 at one end thereof. The reduced portion 43 has a groove 41 thereon to receive an oil seal 42. The second body 4 has a locking recess 44 close to the reduced portion 43. Preferably, the second body 4 has two locking recesses 44. The locking recess 44 has a channel 441. The channel 441 has an L-like shape. The channel 441 is provided with two stoppers 442 protruding from two inner sides of the channel 441. Each stopper 442 has a chamfer 444 at an outer end thereof and a right-angled inner end. An accommodation room 443 is formed between the two stoppers 442 in the channel 441.

The locking member 2 is first connected to the first body 1. The oil seal 151 cooperates with the stop ring 22 to limit the position of the locking member 2. The reduced portion 43 of the second body 4 is inserted in the first connection opening 13 of the first body 1. The locking block 21 of the locking member 2 is inserted into the locking recess 44 of the second body 4. After the locking block 21 enters the channel 441 of the locking recess 44, the chamfer 444 facilitates entry of the locking block 21 into the channel 441. Particularly, the locking block 21 passes the stoppers 442 to the inside of the channel 441. The locking block 2 is slightly pulled or moved inward to enter the accommodation room 443. At this time, the locking block 21 is not in the channel 441 and stopped by either of the stoppers 442. In particular, the right-angled end of each stopper 442 can ensure engagement of the locking block 21 in the locking recess 44, preventing any unexpected disengagement. The locking block 21 can be moved out of the locking recess 44. The locking member 2 is slightly pulled and moved for the locking block 21 to be in the channel 441 and then the locking member 2 is rotated and applied with a force to disengage the locking member 2 from the second body 4.

When the first body 1, the second body 4 and the locking member 2 are assembled, the reduced portion 43 of the second body 4 is further connected with an inner sleeve 3. The inner sleeve 3 has a space 30 therein and a stop ring 31. The inner sleeve 3 cooperates with the first body 1 to provide a clip and inner support function to the second body 4.

Figure 4:
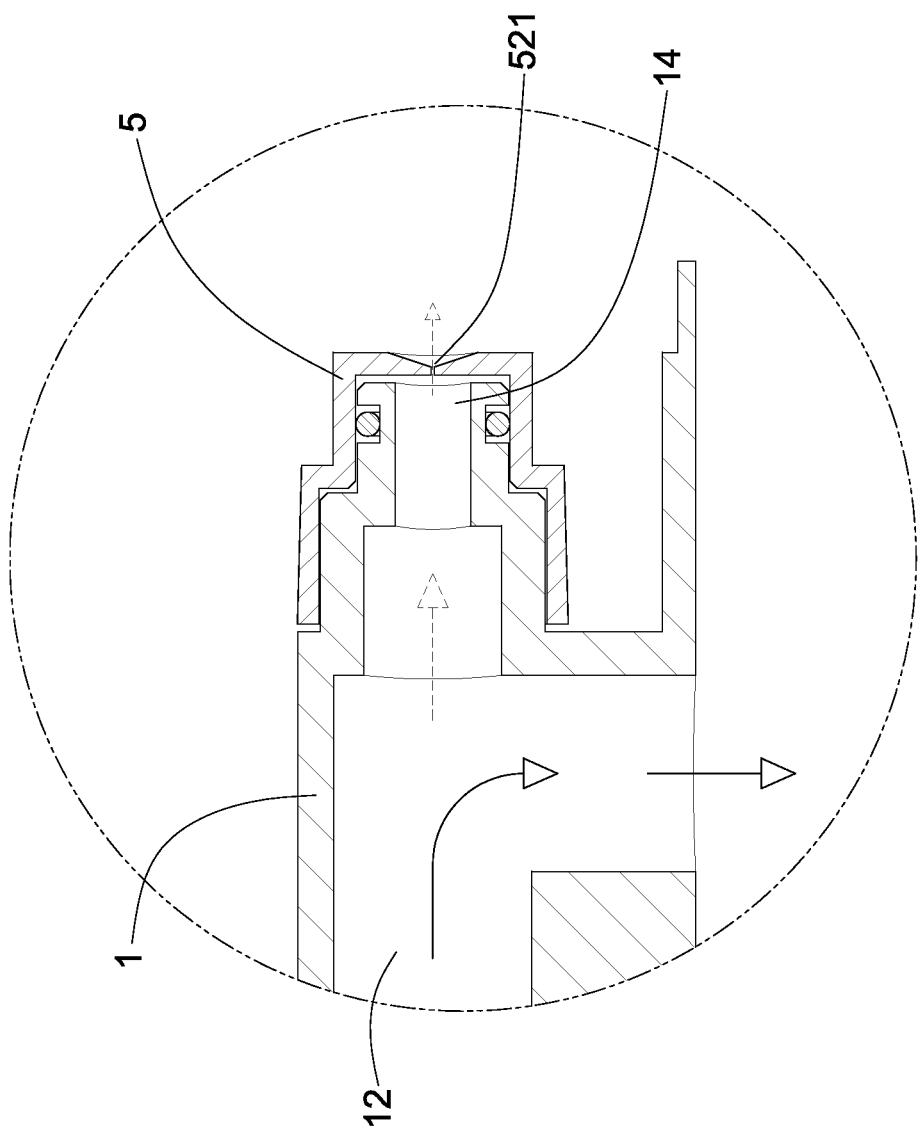
FIG. 4 is a sectional view showing air flow according to the preferred embodiment of the present invention.

The first body 1 of the present invention may have a second connection opening 14 at another end thereof opposite to the first connection opening 13. The passage 12 of the first body 1 has a T shape. The first body 1 has a second locking recess 16 close to the second connection opening 14 for connection of a second locking member 5. The second locking recess 16 and the second locking member 5 have the same configuration as the aforesaid locking member 2 and the locking recess 44, respectively. The second locking member 5 has a closed surface 52. The closed surface 52 may have a through hole 521. The through hole 521 can be provided as desired. As shown in FIG. 4, the through hole 521 is adapted to provide a certain air to the air cushion bed for ventilation.

Figure 5:
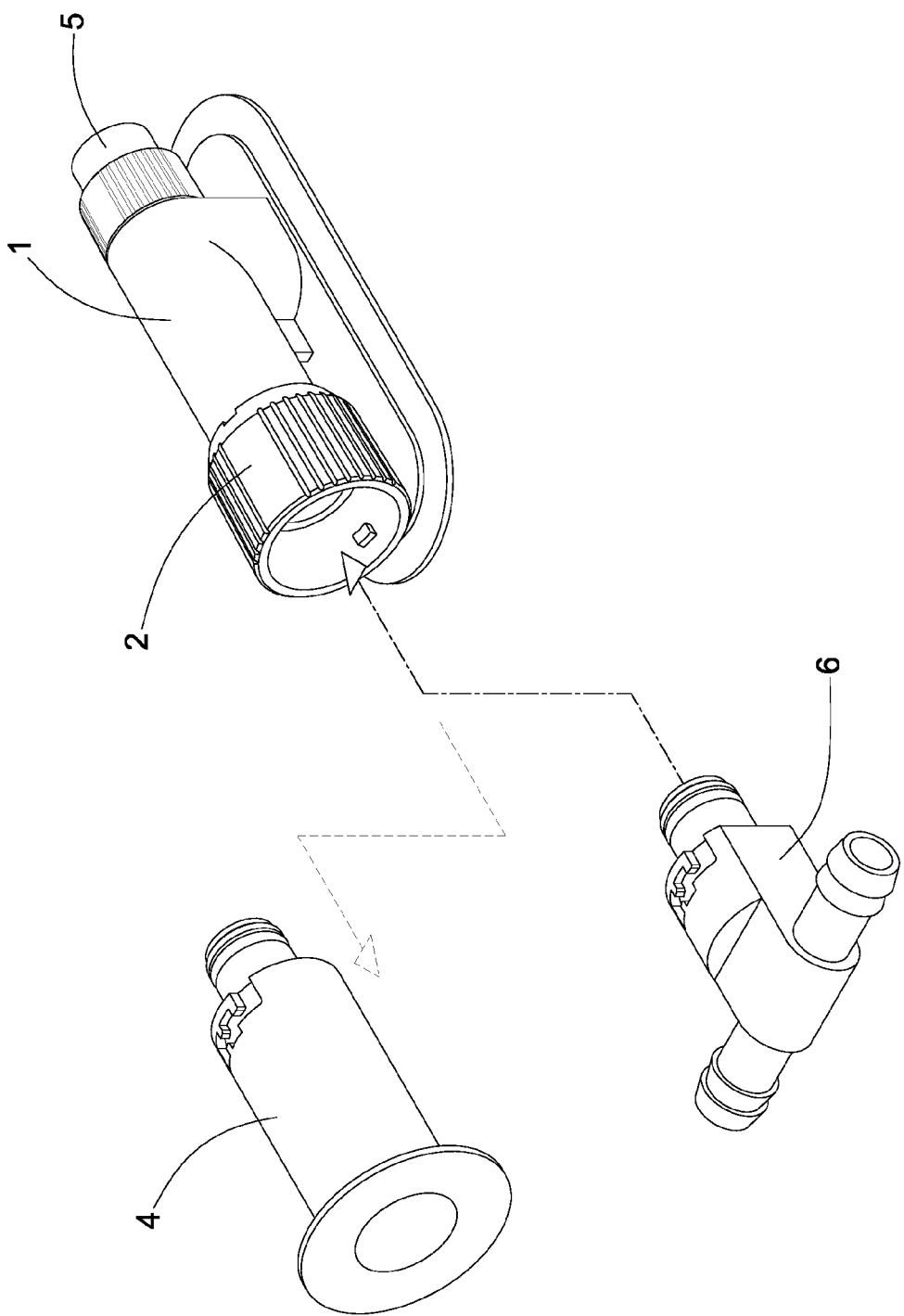
FIG. 5 is a schematic view showing the T-shaped second body according to the preferred embodiment of the present invention.

As shown in FIG. 5, another embodiment of the second body 4 is a T-shaped body 6.

Figure 6:
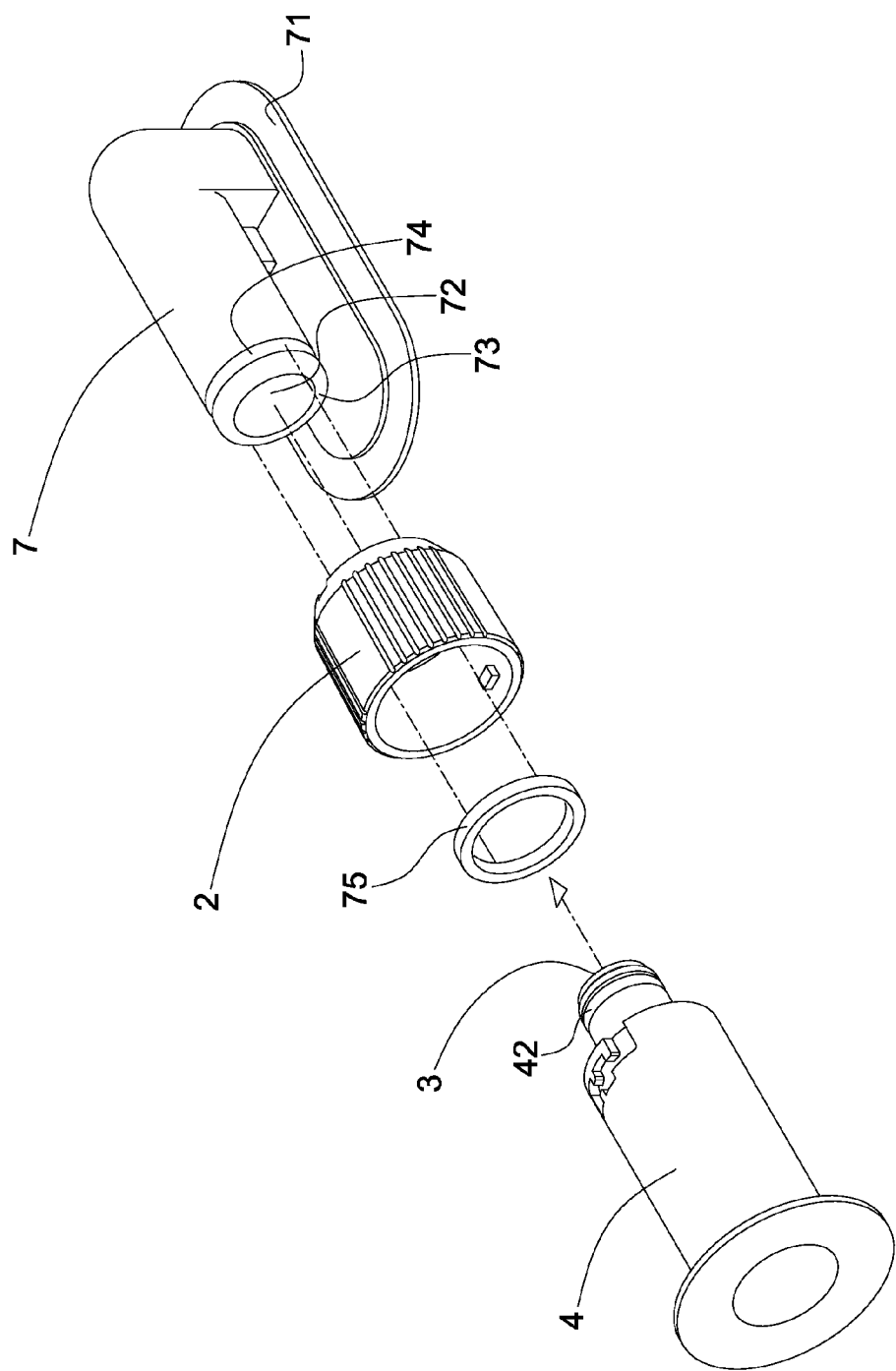
FIG. 6 is an exploded view showing another embodiment of the first body of the present invention.
Figure 7:
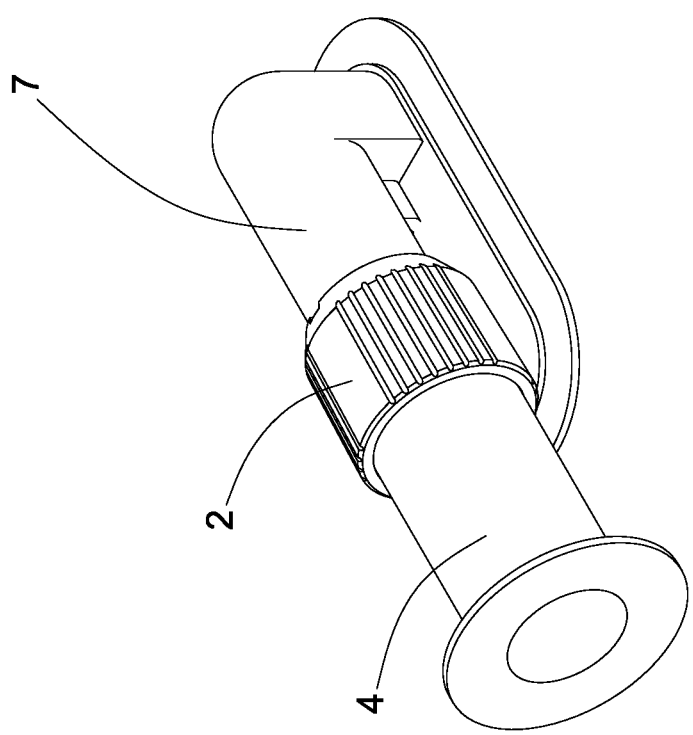
FIG. 7 is a perspective view of FIG. 6.

FIG. 6 shows another embodiment of the first body 7, without the second connection opening 14. The passage 72 of the first body 7 has an L shape.

The present invention has the following advantages:

1. Providing a quick connector structure which can be assembled quickly.
2. Providing an anti-disengagement structure for the quick connector. After assembled, the present invention can prevent any unexpected disengagement to ensure a complete piping and to lower the failure rate.
3. Providing a quick connector structure. The second connection opening is to provide an air release function for ventilation of the air cushion bed.
4. Providing a changeable quick connector structure which can be changed as desired for the demand of different products.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick connector having an anti-disengagement structure, comprising:
   a first body having a first connection opening and an annular groove close to an outer edge of the first connection opening;
   a locking member having a first space therein and a locking block in the first space; and
   a second body having a reduced portion at one end thereof, the reduced portion being inserted into the first connection opening, the second body having a locking recess close to the reduced portion, the locking recess having a channel, the channel having an L-like shape, the channel being provided with a plurality of stoppers protruding from two opposite inner sides and an accommodation room formed inside the recess,
   wherein the first body is connected to and protrudes from a first distal end of the locking member, and the second body is connected to and protrudes from a second distal end of the locking member, the first distal end and the second distal end are formed in opposite directions,
   wherein the annular groove is adapted to receive a first oil seal and the locking member has a first stop ring at a bottom edge of the first space, and the first stop ring is against the first oil seal, and
   wherein the reduced portion of the second body is further connected with an inner sleeve, the inner sleeve has a second space therein and a second stop ring, the inner sleeve is inserted into the reduced portion and the second stop ring is against a distal end of the reduced portion, and the inner sleeve cooperates with the first body to provide a clip and inner support to the second body.

2. The quick connector having an anti-disengagement structure as claimed in claim 1, wherein the locking member has two locking blocks and the second body has two locking recesses.

3. The quick connector having an anti-disengagement structure as claimed in claim 1, wherein the reduced portion of the second body has a groove thereon to receive a second oil seal.

4. The quick connector having an anti-disengagement structure as claimed in claim 1, wherein each stopper has a chamfer at an end thereof.

* * * * *